US009647927B2

(12) United States Patent
Hu et al.

(10) Patent No.: US 9,647,927 B2
(45) Date of Patent: May 9, 2017

(54) COMPUTER-IMPLEMENTED K-SHORTEST PATH FINDING METHOD

(71) Applicant: FUJITSU LIMITED, Kawasaki-shi, Kanagawa (JP)

(72) Inventors: Bo Hu, Winchester (GB); Takahide Matsutsuka, London (GB)

(73) Assignee: FUJITSU LIMITED, Kawasaki (JP)

( * ) Notice: Subject to any disclaimer, the term of this patent is extended or adjusted under 35 U.S.C. 154(b) by 220 days.

(21) Appl. No.: 14/556,355

(22) Filed: Dec. 1, 2014

(65) Prior Publication Data
US 2015/0256442 A1 Sep. 10, 2015

(30) Foreign Application Priority Data
Mar. 5, 2014 (EP) ..................... 14157957

(51) Int. Cl.
*H04L 12/721* (2013.01)
*G06Q 10/04* (2012.01)
*H04L 12/751* (2013.01)

(52) U.S. Cl.
CPC ............. *H04L 45/12* (2013.01); *G06Q 10/04* (2013.01); *H04L 45/02* (2013.01)

(58) Field of Classification Search
CPC ....... H04L 45/02; H04L 45/12; H04L 45/742; H04L 45/46; H04L 45/122; H04L 45/00; G06Q 10/04
See application file for complete search history.

(56) References Cited

U.S. PATENT DOCUMENTS

| 2007/0177512 A1* | 8/2007 | Alexander | ............. H04L 45/12 370/238 |
| 2008/0052378 A1* | 2/2008 | Matsuyama | ............ H04L 41/22 709/218 |

(Continued)

FOREIGN PATENT DOCUMENTS

| CN | 102411730 | 4/2012 |
| KR | 10-0902650 | 6/2009 |

OTHER PUBLICATIONS

N. J. Van der Zijpp, et al., "Path Enumeration by Finding the Constrained K-Shortest Paths", Transporation Research Part B. Methodological, vol. 39, No. 6, Jul. 1, 2005, pp. 545-563.

(Continued)

*Primary Examiner* — Charles C Jiang
*Assistant Examiner* — Rose Clark
(74) *Attorney, Agent, or Firm* — Staas & Halsey LLP

(57) ABSTRACT

A computer-implemented method includes a principal process including performing a computational procedure in which the or each vertex preceding a particular vertex receives a notification that a computational procedure has been completed for the preceding vertex; and calculates new path lengths for the particular vertex by adding the length value attributed to the edge from the preceding vertex to the particular vertex to each of the recorded k shortest path lengths from the first vertex to the preceding vertex. A record of the k shortest path lengths calculated for the particular vertex is maintained. After the new path lengths have been calculated for the or each of the preceding vertices, a notification that the computational procedure has been completed for the particular vertex is issued. The computational procedure is performed with the source vertex as the first vertex and each vertex on a path from the source vertex to the destination vertex as the particular vertex.

11 Claims, 2 Drawing Sheets

(56) References Cited

U.S. PATENT DOCUMENTS

| | | | | |
|---|---|---|---|---|
| 2008/0155119 | A1* | 6/2008 | Imamura | H04L 45/12 709/241 |
| 2010/0063973 | A1* | 3/2010 | Cao | G06F 17/30477 707/758 |
| 2012/0179674 | A1* | 7/2012 | Delling | G06F 17/30533 707/736 |
| 2013/0121340 | A1* | 5/2013 | Papadimitriou | H04L 45/02 370/410 |
| 2013/0339290 | A1* | 12/2013 | Lee | G06F 17/10 706/55 |
| 2014/0156826 | A1* | 6/2014 | Chang | H04L 45/02 709/224 |
| 2015/0295812 | A1* | 10/2015 | Liu | G06F 17/30595 370/238 |

OTHER PUBLICATIONS

Bo Hu, et al., "Towards Big Linked Data", Information Integration and Web-Based Applications and Services, Dec. 3, 2012, pp. 167-176.

Eric Ruppert, "Finding the k Shortest Paths in Parallel," Department of Computer Science, (2000).

Jesper L. Traff, et al., "A Simple Parallel Algorithm for the Single-Source Shortest Path Problem on Planar Digraphs," Third International Workshop, Irregular '96 Santa Barbara, CA, USA, Aug. 19-21, 1996 Proceedings.

European Search Report mailed Jun. 24, 2014 in corresponding European Application No. 14157957.3-1955.

* cited by examiner

COMPUTER-IMPLEMENTED K-SHORTEST PATH FINDING METHOD

CROSS-REFERENCE TO RELATED APPLICATIONS

This application claims the benefit of European Application No. 14157957.3, filed Mar. 5, 2014, in the European Intellectual Property Office, the disclosure of which is incorporated herein by reference.

BACKGROUND

1. Field

The present invention lies in the field of algorithms and processing methods for graph databases. In particular, the present invention relates to a method for finding the k shortest paths between two vertices in a graph database.

2. Description of the Related Art

Shortest path analysis is a fundamental graph processing operation. It computes either the shortest path from a single source vertex to every other vertex in the graph, the shortest path between a specified pair of vertices, or the shortest path between every pair of graph vertices. Shortest path is normally computed on a directed, weighted graph where the edge weights can be equal or different and positive or negative (if negative loops do not exist). Shortest path analysis can also be carried out in an undirected graph. Algorithms exist for finding the shortest path between two vertices in a graph database, for example, the Dijkstra algorithm presents good theoretical and practical results.

In practice, finding the shortest path is not always the most useful operation, and applications may, in fact, require discovery of the second shortest, third shortest, etc. paths. For example, there may be scenarios in which the shortest path is not always ideal or available. Therefore, operations exist for finding the k-shortest paths.

An existing k-shortest path algorithm is the Yen algorithm. The Yen algorithm first computes the shortest path P using, for example, the Dijkstra algorithm. It then iteratively breaks away from P, by defining a branch point and replacing an edge on P with a sub-optimal edge. The final top ranking K alternative paths are then considered the solution to the problem.

Due to the nature of the Yen algorithm (maintaining centralized queue of next vertex to be processed, K iteration is based on the status of K−1 iteration, monitoring global variables, etc.) it is difficult to parallelize and hence is computationally expensive. System performance bottlenecks can arise.

SUMMARY

Additional aspects and/or advantages will be set forth in part in the description which follows and, in part, will be apparent from the description, or may be learned by practice of the invention.

Embodiments of the present invention include a computer-implemented method for finding the k shortest path lengths among paths between a source vertex and a destination vertex in a data graph composed of vertices interconnected by edges, a path being any series of vertices connected by edges along which path no single vertex is included more than once, the edges being attributed length values, and wherein k is an integer greater than or equal to two, the method including performing a principal process, the principal process comprising performing a computational procedure. The computational procedure comprises, for the or each vertex preceding a particular vertex, wherein a vertex is defined as preceding the particular vertex if the vertex is connected to the particular vertex by an edge and the vertex lies on one of the paths from a first vertex to the particular vertex: receiving a notification that the computational procedure has been completed for the preceding vertex; and calculating new path lengths for the particular vertex by adding the length value attributed to the edge from the preceding vertex to the particular vertex to each of the recorded k shortest path lengths from the first vertex to the preceding vertex; the computational procedure further comprising: maintaining a record of the k shortest path lengths calculated for the particular vertex; and after the new path lengths have been calculated for the or each of the preceding vertices, issuing a notification that the computational procedure has been completed for the particular vertex. The principal process comprises performing the computational procedure with the source vertex as the first vertex and each vertex on a path from the source vertex to the destination vertex as the particular vertex. The method further comprising, simultaneously to the principal process, performing one or more parallel processes, the or each parallel process comprising performing the computational procedure with a parallel process starting vertex as the first vertex and each vertex on a path from the parallel process starting vertex to the parallel process ending vertex as the particular vertex, wherein the parallel process starting vertex and the parallel process ending vertex are both on a path from the source vertex to the destination vertex.

Advantageously, embodiments of the present invention provide a principal process which uses data available locally, at a vertex for which a computational procedure is being carried out and its preceding vertices, to establish the k shortest path lengths from the source vertex to the vertex for which the computational procedure is being carried out. It is a consequence of the method that in calculating the k shortest path lengths from a source vertex to a destination vertex, the k shortest path lengths from the source vertex to every vertex on a path between the source vertex and destination vertex are also calculated.

The method includes one or more parallel processes which are executed contemporaneously with the principal process. For example, it may be that separate CPUs are engaged in performing the or each of the parallel process to the CPU (or CPUs) engaged in performing the principal process.

By calculating the k shortest path lengths from a parallel process starting vertex to each of a number of other vertices, some preliminary computation is performed which reduces the computation required when performing the computational procedure for vertices for which the computational procedure has been carried out as part of a parallel process. By parallelizing some of the computation, the overall system bottleneck caused by the method is reduced or mitigated. Effectively, the parallel processes compute some path length portions which contribute to the calculation of path lengths involved in the principal process.

A method may be initiated by the source vertex issuing a notification that the procedure has been completed for the source vertex (or a notification configured to trigger the vertices for the computational procedure to begin for a vertex for which the principal process starting vertex is a preceding vertex). The method may be performed at the request of an application, the request specifying at least the source vertex and optionally additionally one or more destination vertices.

The k shortest paths (the path lengths and data identifying the precedent vertices on the respective paths) from the principal process starting vertex to a particular vertex may be stored at the particular vertex.

The method may be implemented in a single source vertex to many destination vertex fashion. For example, the method may be repeated at least once with the same source vertex on each repetition and a different destination vertex on each repetition.

Optionally, it may be that the destination vertex is unspecified, and that the operation is to find the k shortest path lengths from a specified source vertex to any other vertex in the data graph. The destination vertex can be changed iteratively, so that the principal process is eventually carried out for every vertex in the data graph other than the source vertex. Where the principal process is referred to as being performed/carried out/executed for a vertex, it is taken to mean that the vertex in question is the particular vertex for an iteration of the computational procedure forming part of the principal process.

By performing the method iteratively or repeatedly with a fixed or constant source vertex and changing the destination vertex each time (for example, choosing each vertex at the boundary of the data graph as the destination vertex), the method enables a "one-to-many" type k shortest path length operation to be carried out. In a single source vertex to many destination vertex operation, the method may be performed iteratively with the single source vertex fixed and each of the many destination vertices. It is a consequence of the method that performing the method for one destination vertex will result in the k shortest path lengths from the source vertex to every vertex on a path from the source vertex to the one destination vertex being calculated and stored. Therefore, in order to complete the method for a one too many operation, after the principal process has been performed for one destination vertex, the principal process need only be performed for vertices not on a path from the source vertex to the destination vertex. In other words, as long as the principal process starting vertex is unchanged, the computation that has already been performed for other process ending vertices that have paths or path portions in common with the current destination is stored, and new computational procedures only need be performed for any vertices on paths from the source vertex to the current destination vertex that do not appear on paths from the principal process starting vertex to the other process ending vertices. The computational procedure as part of the parallel process need only be performed for the or each destination vertex, and for each vertex on a path from the source vertex to the or each destination vertex, once in order to calculate the k shortest path lengths from the source vertex to the or each of the destination vertices and each vertex on a path between the source vertex and the destination vertex.

The computational procedures forming part of the principal process are performed on a vertex by vertex basis at a cpu (or at a cpu node) as a processing thread. The computational procedures forming part of the or each parallel process are also performed on a vertex by vertex basis at a cpu (or cpu node) different from the cpu (or cpu node) at which the computational procedures forming part of the principal process are performed. The k shortest path lengths calculated as part of the one or more parallel processes can be combined with the k shortest paths calculated as part of the principal process to obtain preliminary values for the k shortest path lengths from the source vertex to the vertices at which the computational procedure was performed as part of the parallel process.

The k shortest preliminary paths stored at the vertices for which the preliminary computational procedure has been carried out can be combined with the k shortest paths calculated for vertices for which the computational procedure has been carried out. For example, after the issuance of the notification that the computational procedure has been completed for a parallel process starting vertex, from among the one or more parallel process starting vertices, as part of the principal process, and after the issuance of the notification that the computational procedure has been completed for the corresponding parallel process ending vertex as part of the parallel process, modifying the k shortest path lengths from the parallel process starting vertex recorded at each of the vertices for which the computational procedure was performed as part of the parallel process by adding the k shortest path lengths from the source vertex recorded at the parallel process starting vertex.

By combining the results in this way, useful results are obtained at the vertices for which the computational procedure has been carried out as part of a parallel process, but for which the computational procedure has not yet been carried out as part of the principal process. Namely, the results are the k shortest paths from the source vertex to the vertex in question along paths which include the parallel process starting vertex. Thus, although not the absolute k shortest paths from the source vertex to the vertex in question, the k shortest path lengths obtained by modifying the k shortest paths calculated in the parallel process do have some significance and may be useful to an application.

Particular opportunities for parallelization may be present in embodiments in which the data graph is divided into regions and stored distributed across more than one data storage unit, each data storage unit storing at least one of the regions and having a dedicated computational processing unit, the computational procedure being performed by the computational processing unit dedicated to the data storage unit on which the particular vertex is stored. In particular, the or each of the parallel process starting vertex and the corresponding parallel process ending vertex are from the same region, the parallel process starting vertex being a boundary vertex of the region, and the preliminary computational procedure is performed for each vertex on any path composed of vertices also in the same region.

It can be appreciated that the division of the method into the computational procedure and the preliminary computational procedure enables a procedure to be carried out for a region stored on a data storage unit other than the data storage unit storing the source vertex in parallel with the computational procedure being performed at the data storage unit storing the source vertex. One or more other regions may also have the preliminary computational procedure carried out in parallel. In each instance the parallel processing starting vertex may be selected as an arbitrary boundary vertex of the region, or may be a boundary vertex which is known to have a shorter path to the region in which the source vertex is stored than other of the boundary vertices. Such knowledge may be based on, for example, cached results.

A boundary vertex is a vertex in one region connected by an edge to a vertex in another region.

The parallel process may be performed on a repetitive or iterative basis so that the number of vertices for which k shortest paths are calculated in parallel processes increases. For example, the or each parallel process is repeated at least once with the same parallel process starting vertex on each repetition and a different parallel process ending vertex on each repetition. It may be that the parallel process ending vertices are selected as each of the other boundary vertices of the region, and that the parallel process is completed for a particular region when the preliminary computational procedure has been performed for each of the vertices in the region connected via a path to the parallel process starting vertex.

Central vertices may be determined for each of the regions of the data graph. Advantageously, central vertices form a useful tool in methods embodying the present invention because they can be assumed to be typical of vertices in the region in terms of distances to other regions. This property can be leveraged in selecting parallel process starting vertices. For example, the method may include, for each region, for each vertex at the boundary of the region, storing the vertex in association with the shortest path length from the vertex to the or each of the one or more identified central vertices of the region; and selecting the parallel process starting vertex by: identifying, from among the boundary vertices in the region including the source vertex which are connected by an edge to a neighboring region stored on a different data storage unit, the boundary vertex having the shortest path length to the identified central vertex or the smallest average shortest path length to the more than one identified central vertices; and selecting as the parallel process starting vertex either the identified boundary vertex or a boundary vertex in the neighboring region connected to the identified boundary vertex by an edge.

Alternatively, it may be that each boundary vertex of each region is stored in association with a shortest path length from the central vertex (or average shortest path lengths from the more than one central vertices) of each other region. In that way, a parallel process can be performed at each data storage unit simultaneously. The region for which the parallel process is performed at a particular data storage unit may be selected as the region stored on the particular data storage unit which has the boundary vertex, from among the boundary vertices stored on the particular data storage unit, that has the shortest path length to the central vertex of the region of the source vertex. A parallel process starting point for any region may be selected as the boundary vertex of that region with the shortest path length from the central vertex (or average shortest path lengths from the more than one central vertices) of the region of the source vertex.

Depending on the implementation, it may be that the data graph is stored with vertices at the boundary of two regions stored as part of both of the two regions. A pair of regions are neighboring if a vertex in one of the pair connects to a vertex in the other of the pair by an edge.

As an exemplary procedure for determining the central vertex of a region, it may be that the central vertices of a region are identified based on a betweenness centrality measure.

The precise format in which the k shortest path lengths are stored at the vertices will depend on the requirements of the embodiment and on the format of the particular data graph. In some implementations, it may be that solely the path lengths are of interest. In other implementations, it may be that both the path length and the precedent vertices on the k shortest paths are required. Optionally, maintaining a record of a shortest path length includes storing the path length in association with information identifying the one or more precedent vertices on the respective path.

An exemplary format in which to store paths is as a heap. Optionally, maintaining a record of a shortest path length includes storing, at the particular vertex, the precedent vertices on each of the k shortest paths in a heap format with the respective k shortest path lengths as indexing values.

The heap structure is efficient in terms of space requirements, is quick to query, quick to update, and facilitates easy comparison with values not stored in the heap. A particular form of heap which may be used in embodiments is a binary max heap. Advantageously, the root of such a heap is the largest value, so if the shortest of the calculated new path lengths is not shorter than the root of the binary max heap stored at the particular vertex, it can be determined immediately that no update is required. Correspondingly, if one or more of the calculated new path lengths are shorter than path lengths already stored in the heap of the particular vertex, then the heap is to be updated so that the k shortest path lengths (and their associated paths) from among the calculated new path lengths and k paths already stored in the heap are stored in the updated heap.

It may be that some efficiency can be gained in terms of storage space at the vertices by, rather than storing identifications of all of the vertices on all k of the paths for each of the k paths, storing one path in a fully identifiable format and then storing the remaining paths in dependence upon the first path. For example, storing the precedent vertices on each of the k shortest paths includes storing an identification of each of the precedent vertices on the shortest path, and for the remaining k−1 shortest paths, storing an identification of differences from the shortest path.

The computational procedure performed for a particular vertex effectively gathers/determines/calculates/computes the k shortest path lengths from among the k shortest path lengths determined/calculated/computed for each of the vertices preceding the particular vertex, modified by adding the path length from the respective preceding vertex to the particular vertex. Particular techniques for performing the computational procedure include: a first example in which, in the computational procedure, calculating new path lengths for the particular vertex is performed on behalf of each preceding vertex in turn, is performed by: temporarily locking access to the record of the k shortest path lengths calculated for the particular vertex; calculating new path lengths for the particular vertex by adding the length value attributed to the edge from the preceding vertex to the particular vertex to each of the recorded k shortest path lengths recorded at the preceding vertex; updating the record of the k shortest path lengths calculated for the particular vertex so that it contains the k shortest path lengths from among the calculated new path lengths and the locked recorded k shortest path lengths; and unlocking access to the record of the k shortest path lengths.

In a second example, issuing a notification that the computational procedure has been completed for a particular vertex includes transmitting to the or each vertices for which the particular vertex is a preceding vertex on a path from the source vertex to the destination vertex, the record of the k shortest path lengths for the particular vertex; and, in the computational procedure, and calculating new path lengths for the particular vertex comprises adding the length value attributed to the edge from the preceding vertex to the particular vertex to each of the k shortest path lengths included in the record received from the preceding vertex.

The computational procedure at a particular vertex relies on the computational procedure having been completed for all of the preceding vertices (preceding in this document being used in a topographical sense, but owing to the nature of the method, also being appropriate in a temporal sense). Therefore, the computational procedure, which defines a processing thread by being carried out for one particular vertex after another, can be considered to spread progressively outward from the source vertex (or parallel process starting vertex) along paths leading to the destination vertex/vertices. It may be that the method includes a particular technique for ordering computational procedures. For example, the principal process includes determining the order in which the vertices become the particular vertex for which the computational procedure is performed by, selecting as the next particular vertex, from among the vertices for which the computational procedure has not yet been completed and for which the computational procedure has been completed at the or each of the respective preceding vertices, the vertex having the preceding vertex recorded as having the shortest path length to the source vertex.

Embodiments of another aspect include an apparatus for finding the k shortest path lengths among paths between a source vertex and a destination vertex in a data graph composed of vertices interconnected by edges, a path being any series of vertices connected by edges along which path no single vertex is included more than once, the edges being attributed length values, and wherein k is an integer greater than or equal to two, the apparatus being configured to perform a principal process, the principal process comprising performing a computational procedure, the computational procedure comprising, for the or each vertex preceding a particular vertex, wherein a vertex is defined as preceding the particular vertex if the vertex is connected to the particular vertex by an edge and the vertex lies on one of the paths from a first vertex to the particular vertex: receiving a notification that the computational procedure has been completed for the preceding vertex; and calculating new path lengths for the particular vertex by adding the length value attributed to the edge from the preceding vertex to the particular vertex to each of the recorded k shortest path lengths from the first vertex to the preceding vertex. The computational procedure further comprises: maintaining a record of the k shortest path lengths calculated for the particular vertex; and, after the new path lengths have been calculated for the or each of the preceding vertices, issuing a notification that the computational procedure has been completed for the particular vertex; wherein the principal process comprises performing the computational procedure with the source vertex as the first vertex and each vertex on a path from the source vertex to the destination vertex as the particular vertex. In addition, the apparatus is configured, concurrently with the principal process, to perform one or more parallel processes, the or each parallel process comprising performing the computational procedure with a parallel process starting vertex as the first vertex and each vertex on a path from the parallel process starting vertex to the parallel process ending vertex as the particular vertex, wherein the parallel process starting vertex and the parallel process ending vertex are both on a path from the source vertex to the destination vertex.

For example, the apparatus may be a plurality of computational processing resources loaded with instructions, or may be a data storage apparatus having computing resources for performing more than one processing thread concurrently.

Embodiments of another aspect include a suite of computer programs which, when executed by computing apparatuses in a data storage system configured to store a data graph, cause the computing apparatuses to perform a method embodying the present invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
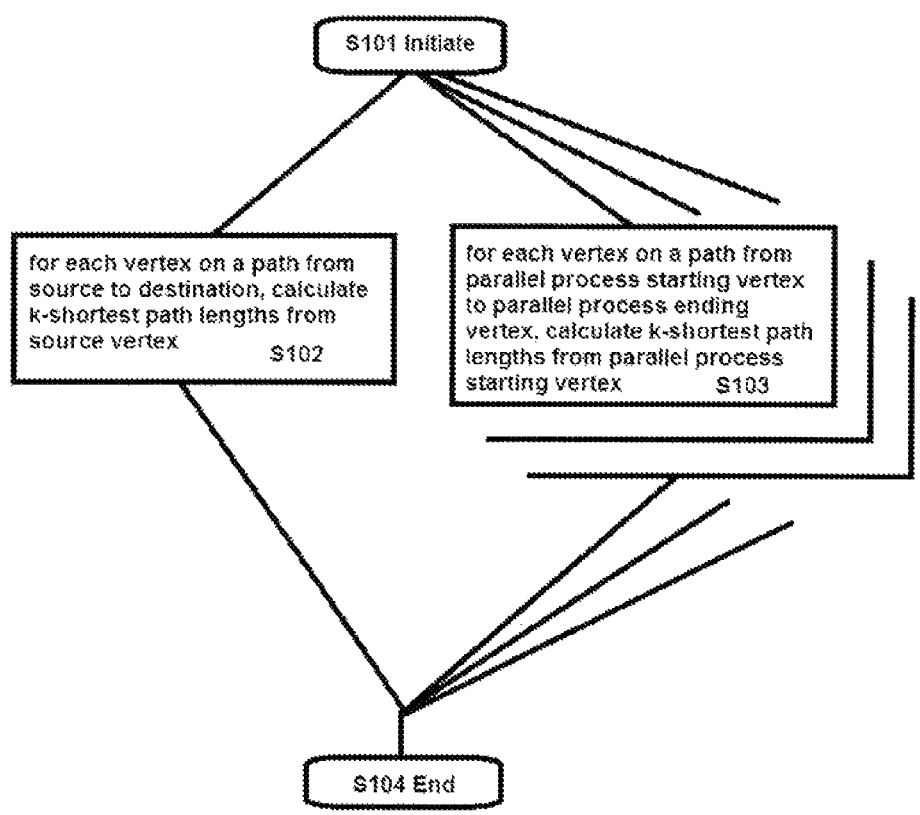
FIG. 1 is a flow chart representing a method embodying the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a flow chart representing a method embodying the present invention. In an approximate sense, time increases from top to bottom, so step S101 is performed first, then steps S102 and S103 are performed at least partially in parallel, and then step S104 is the end of the method.

At step S101 the method is initiated. The method may be started in response to a request or instruction from an application or some other entity capable of instructing processing to be carried out on the stored data graph. For example, the database controller may receive a query for the k shortest paths from a first vertex to a second vertex. The initiation step S101 may also include, from the source vertex, transmitting a notification to each subsequent vertex on a path from the source vertex to the destination vertex that the computational procedure has been completed at the source vertex, or in some other way triggering the computational procedure to be carried out in those subsequent vertices.

The initiation step S101 may also include selecting parallel process starting and ending vertices. The plurality of lines between S101 and S103, and S103 and S104, represent the possibility of there being more than one parallel process. It is to be noted that the more than one parallel processes are not necessarily carried out simultaneously. However, in embodiments, at least part of a parallel process is performed whilst the principal process S102 is being performed. It may be that parallel processes S103 are stopped when the principal process S102 reaches vertices on paths from the parallel process starting vertex to the parallel process ending vertex, so that parallel processes are prevented from holding up the principal process.

Step S102 represents the principal process, in which the computational procedure, which calculates and maintains or stores the k shortest paths from the source vertex to the particular vertex for which the computational procedure is being performed, is carried out for each vertex on a path from the source vertex to the destination vertex.

A path is any series of vertices connected by edges along which path no single vertex is included more than once. That is to say, a path cannot cross itself, reverse on itself, or form a loop. The path length is the sum of the length values attributed to the edges connecting the vertices on a path. Length values may be positive or negative, although, in some embodiments length values may be limited to being positive values. The lower the sum of the length values attributed to the edges connecting the vertices on a path, the shorter the path. A path may be considered to be a path length and an identification of the precedent vertices on the path, and a path may be stored in a form in which the path length is identifiable and the precedent vertices on the path are identifiable. Alternatively, where edges are individually identifiable, a path may be stored in a form in which the path length is identifiable and the edges on the path are identifiable. The k shortest paths may be recorded as an alternative to, or in addition to, the k shortest path lengths.

A vertex is a graph element linked by at least one edge to another graph element. The term node or resource may also be used to refer to a vertex. A vertex may store information, for example, a vertex identifier may be a key in a key value store, with the value being stored information. Examples of such stored information include a record of the k shortest paths from the principal process starting vertex (i.e. the source vertex) to the vertex, and a checklist of preceding vertices so that it is determinable from information stored at the vertex when a notification that the computational procedure has been completed for each of the preceding vertices has been issued.

An edge is an interconnection between two vertices. Edges may be directional, so that the edge itself determines the precedence of the two vertices it interconnects: the vertex from which the edge is outgoing precedes the vertex to which the edge is incoming. Alternatively, edges may be non-directional, so that precedence is determined by path geometry. Edges may be labeled so that an edge from a first vertex to a second vertex denotes or defines a logical connection between the first and the second vertex, with the label assigned to the edge defining the form of that logical relationship. For example, the first vertex may be considered to be a subject vertex and the second vertex an object vertex. The label of the edge identifies a property of the subject vertex, and the value of the object vertex defines a range or value of that property attributable to the subject vertex. An edge may alternatively be referred to as an interconnection. Predicate is a term that may be used to define the label assigned to the edge. In embodiments in which edges are homogenous, that is to say, there is only one form of edge and the label attributed to an edge therefore has no positive effect in distinguishing the edge from other edges, the length value attributed to the edge may be stored in place of the label.

The data graph is a manifestation of stored data, and is a means for representing the stored data, both to a user and to event handlers or other processes internal to the data storage system. It may be that the data graph is encoded as triples, for example, RDF triples, and that a resource is defined by the triples in which it is named as the subject. Alternatively or additionally, it may be that data is stored in a key value store, with triples serving as keys indexing storage locations at which additional data (for example, metadata) defining a vertex is stored.

In this document it is assumed that where functions are described as taking place at a vertex or some other element of the data graph, that the function is actually being performed at a processing resource on data including the data encoding that graph element. Similarly, data or information stored at a vertex is stored forming a part of the data encoding the vertex.

Step S103 represents the one or more parallel processes, in which the computational procedure, which calculates and maintains or stores the k shortest paths from the parallel process starting vertex to the particular vertex for which the computational procedure is being performed, is carried out for each vertex on a path from the parallel process starting vertex to the parallel process ending vertex.

The or each parallel process is performed whilst the principal process is being performed, or is performed at least partially whilst the parallel process is being performed. The computational procedure performed at each vertex relies upon the computational procedure having been carried out for each of the preceding vertices on paths from the source vertex to the particular vertex. Therefore, the principal process is performed first for vertices closest to the source vertex, and progresses along paths away from the source vertex. Thus, the parallel process starting vertex (or vertices) may be selected as a vertex that is more than a predetermined minimum number of vertices from the source vertex, or may be selected as a vertex that is in another region of the data graph from the region of the source vertex (in embodiments in which the data graph is divided into regions for storage). The parallel process is exemplary of processing that can be performed before the principal process has reached as far as the parallel process starting vertex.

Embodiments are not limited to the principal process, or to the or each of the parallel processes, being performed as a single processing thread. Depending on the computing resources available, it may be that some processing involved in the principal process can be parallelized. Similarly, some processing involved in a particular parallel process may be parallelized.

Step S104 is the end of the method. Step S104 may include notifying a querying entity of the k shortest paths stored at the or each destination vertex.

Formats for storage of the data graph (or graph database) and the values and information required or desirable in embodiments will now be discussed. Embodiments are suitable for implementation in data graphs in which a path length is attributable to each edge. For example, each edge is stored in association with a length value. In a general data graph supporting edge attributes, length values, which can also be referred to as edge weights, can be stored as an element of the edge attributes. In some data graphs, it may be that the only value attributable to an edge is the edge label. Embodiments may still be implemented on such data graphs. For example, on this case, one of the following approaches to storing the graph database (the data graph) can be adopted:

when the edges are homogeneous (i.e. the edges are all labeled the same), the storage space reserved for the RDF edge label can be used to store the length value attributed to the edge; or length values can be concatenated to edge labels and during the computational procedure extracted by parsing the labels with a separate read operation; or a non-RDF construct can be used such as XML tagging can be used, which requires specific processing to be performed for parsing and extracting;

edge attributes such as length values can be emulated using special relation concepts, in combination with complementary ontological reasoning and graph analysis procedures.

In terms of the data structure of the vertices themselves, exemplary data storage formats which facilitate the computational procedure will now be discussed.

In one example, at each vertex, the following information is stored: given a source vertex S:K shortest paths from S to the current vertex, wherein the k shortest paths is taken to be the k shortest path lengths and an identification of the precedent vertices on each of the k shortest paths).

The above information is stored in pairs (a path length and the corresponding precedent vertices forming a single pair). For fast retrieval and insertion, a Heap is used as the particular data format, with the lengths of paths as indexing values. An exemplary form of heap is a binary max heap. In a binary max heap, the root element is always the largest path length from among the K shortest paths stored at the vertex. The k shortest paths stored at a vertex at any time are the k shortest paths from the process starting vertex that have been calculated up until that time. Once the computational procedure has been completed for a vertex as part of a process, that is to say, the computational procedure has been completed for each of the precedent vertices, and the k shortest paths stored at those precedent vertices, along with the respective length values attributed to the paths from the respective precedent vertices to the vertex in question, have been used to update the k shortest paths stored at the vertex in question, the k shortest paths stored at the vertex in question can be taken to be the actual k shortest path lengths from the process starting vertex to the vertex in question. The binary max heap stored at a vertex is updated as follows in the execution of the computational procedure:

Let p' be the new path length to be considered at a particular vertex (i.e. one of the k shortest path lengths stored at a preceding vertex plus the length value attributed to the edge from the preceding vertex to the particular vertex). h.root is a function which returns the root element of the heap, and h.heapify( ) is a function which rebuilds the heap.

1. If p'<h.root, found a shorter path, go to step 2; else go to step 3
2. Remove h.root, assign h.root=p'
   h.heapify( ) the new max heap
   h.root is still the biggest/largest path length
3. Discard p'

When the results need to be sorted, one can either use a quick sort algorithm over the entire max heap or take the root element at each step and then rebuild the heap at a reduced size.

The second element to be saved and at vertex local is the k shortest paths so far, in terms of precedent vertices on the path. The ith shortest path where 1<i<k is likely to be a variant of the shortest with an overlap on the vertices. A string compression methods can be applied to reduce the size of data stored at the vertex. For instance, the shortest path can be stored in a format which enables each preceding vertex to be identified. The remaining k−1 from among the k shortest paths can be stored in a format which enables the difference between the shortest path and the path in question to be identified. Alternatively, the differences between the k shortest paths on the vertex in question and the K shortest paths a specified preceding vertex can be stored.

Depending on the actual implementation of the graph, storage implementation can be different. The k shortest paths from a process starting process to a vertex can be stored at the vertex by utilizing the value part of a key value store, in which a triple for which the vertex is the subject is the key. For edge-oriented graph storage, the above data structure can be stored at the edge when the vertex is introduced. For instance, in RDF graph storage, the above information can be stored at the RDF triple in the following format:

(http://foo.bar/someentity,rdf:type, http://foo.bar/sometype), where the RDF resources is formally defined.

For vertex-oriented graph storage, such information can be stored as a (hidden) vertex attribute.

Methods find the k shortest paths from a process starting vertex (the process starting vertex is referred to as the first vertex elsewhere in this document) to a particular vertex by utilizing the property that for any vertex v, if $P_v=\{p|SP_{st}^K \wedge v \in p\}$, then, $P_v \subseteq SP_{sv}^K \oplus SP_{vt}^K$, where SP stands for shortest path between the given two vertices. That is to say that, a shortest path from a source vertex s to a destination vertex t containing a vertex v can be obtained by adding the shortest path from s to v to the shortest path from v to t. On this basis, the computational procedure as part of the principal process or the parallel process proceeds on a vertex by vertex basis.

An exemplary method may include the following steps:

initialise the vertices by adding to the data encoding each vertex a table or some other form of stored data in which k shortest path lengths are initially stored as ∞;

trigger the message from source vertex S to subsequent vertices on a path from S to the destination vertex which notifies those subsequent vertices that the computational procedure can be performed with the subsequent vertices as the particular vertices;

proceed with the principal process, with each vertex receiving messages from its precedent vertices and update the local K shortest paths (by gradually replacing the ∞ values and then replacing any path lengths which are longer than newly-calculated path lengths from the source vertex to the vertex in question);

each vertex maintains a checklist of all of its precedent vertices. After receiving a message from a precedent that the computational procedure has been performed at that precedent vertex, and updating the k shortest paths stored at the vertex in response (if update is required), the corresponding element of the checklist will be checked. Once every element of the checklist is checked, notifying the or each subsequent vertices on paths that the computational procedure for the vertex is complete; and selecting a portion of the graph at which to perform a parallel process and initiating the parallel process by triggering a message from the parallel process starting vertex PIS to subsequent vertices on a path from PIS to the parallel process destination vertex which notifies those subsequent vertices that the computational procedure can be performed with the subsequent vertices as the particular vertices;

proceed with the parallel process, with each vertex receiving messages from its precedent vertices and calculating and storing the local K shortest paths from PIS to the vertex;

once the principal process reaches the parallel process starting vertex, at each vertex for which the computational procedure was performed as part of the parallel process, adding the k shortest paths from S to PIS to the k shortest paths from PIS to the vertex, to find the k shortest paths from S to the vertex via PIS.

Figure 2:
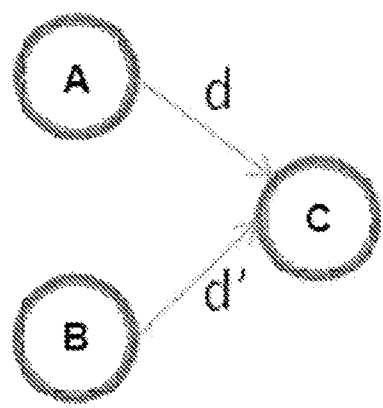
FIG. 2 is an illustration of a fragment of a data graph in an invention embodiment.

Exemplary procedures for performing the computational procedure will now be discussed. FIG. 2 illustrates a fragment of a data graph. The edges from A to C and from B to C are directed edges. Vertices A and B precede vertex C. The length value d is attributed to the path from vertex A to vertex C. The length value d' is attributed to the edge from B to C.

As a first example of how the computational procedure may be performed for vertex C as the particular vertex: vertex A obtains a lock and iterates through the K shortest paths stored at vertex A and updates the k shortest paths stored at vertex C accordingly if, for any of the ith shortest paths stored a vertex A (wherein $1 \leq i \leq k$), $l_i^a + d$ is less than the longest of the k shortest paths currently maintained at vertex C (wherein $l_i^a$ is the path length of the ith shortest path from the process starting vertex to vertex$^a$). The lock is then released to allow vertex B to update the k shortest paths maintained at C in the same way.

As a second example, both vertex A and B pass their local k shortest paths to vertex C as a message, for example, once the computational procedure has been completed as those vertices. The computational procedure for vertex C then includes sorting the incoming data based on the path lengths, identifying the k shortest paths from among the m (m=number of preceding vertices×k) received paths modified by adding the length value attributed to the edge from the vertex from which the message was received to the particular vertex, and then make local updates using the k identified paths.

The principal process and the parallel process are based on the same computational procedure, which can be summarized as follows:

A vertex passes the current k-shortest path information to all its neighbours and initiates the updates at such neighbouring vertices The current status of a vertex changes based on the messages it receives and thus its reaction to the messages changes.

Assume the graph is distributed into P regions, with each region being stored on separate data storage units having their own dedicated processing resources. The computation process is initiated by updating the local shortest path cache at the source vertex s. An update event is triggered. This event will be caught by observer at s, resulting s sending messages to subsequent vertices on paths from s to the destination vertex.

Distributed data graphs (graphs divided into regions) may have a plethora of boundary vertices with a presence in more than one graph partitions (a partition being the stored version of a region of the data graph). That is to say, boundary vertices may be replicated and stored as part of both of the regions between which they form a boundary. Methods utilize this data storage structure to carry out concurrent processing.

Methods may include performing some heuristic analysis in order to decide upon parallel process starting vertices. An exemplary technique for selecting parallel process starting vertices will now be discussed: note that this is applied when the principal procedure has not yet been completed for each vertex on a path from the source vertex to the destination vertex. In such a case, computation continues from the boundary vertex or vertices presenting the shortest or first K shortest paths.

A preparation stage can be performed while the system storing the data graph is at idle or offline when more computing resource is available.

The preparation stage includes obtaining betweenness centrality of the graph. Vertices with high betweenness values are preselected as the core set $S_b$. In one example, the core set $S_b$ contains a predetermined number of vertices having the highest betweenness values for the overall data graph (i.e. the most central vertices of the graph as a whole). In another example, the core set $S_b$ contains a predetermined number of vertices for each partition, being the vertices having the highest betweenness values for the partition (i.e. the most central vertices of the partition). For a partition $p_i$, the distances/path lengths between central vertices $\{v|v \in S_b \land v \in p_i\}$ and every boundary vertex is computed and stored.

The exemplary technique utilizes the data computed in the preparation stage by, in a method for finding the k-shortest paths between source vertex s and destination vertex t, in which $p_s$ is the partition containing s and $t \in p_s$: when the computational procedure as part of the principal process starts, for all neighboring partitions of $p_s$, parallel process start with the following priority:

All the neighboring vertices are ranked with the one having lowest average path lengths from central vertices in $p_s$ ranked the top, and others in an ascendant order. The boundary vertices of a partition sharing a boundary with $p_s$ and having the lowest average path length from the central vertices in $p_s$ compared with the other boundary vertices from the same partition is selected as the parallel process starting vertex.

Other techniques may be used for selecting the parallel process starting vertex. For example, for an arbitrary partition $P_j$ including vertices on a path from s to t, a parallel process starting vertex may be selected as the boundary vertex having the shortest path length to the central vertex (or shortest average path length to the central vertices) of ps, based on the preparation stage.

Further alternative techniques may be particularly suited to data graphs which are updated frequently causing betweenness centrality to be unstable. Such further alternative techniques include:

if vertices updated since the betweenness centrality was last measured are not high-degree ones, the original centrality can be used with the assumption that the change of the graph will not significantly affect the overall graph topology; or if vertices updated since the betweenness centrality was last measured are of high-degree, the parallel process will be delayed until after the betweeness centrality for vertices in the partition has been re-calculated and the central vertices updated accordingly.

As outlined above, once the principal process reaches the parallel process starting vertex, at each vertex for which the computational procedure was performed as part of the parallel process, adding the k shortest paths from S to the parallel process starting vertex to the k shortest paths from the parallel process starting vertex to the vertex, to find the k shortest paths from S to the vertex via the parallel process starting vertex. In embodiments in which boundary vertices belonging to an arbitrary partition py are selected as the parallel process starting vertices (and, for example, one or more of the remaining boundary vertices in py on a path from s to t are selected as parallel process ending vertices), once the computational procedure has been performed at a first group of vertices as part of the parallel process, and the computational procedure has been performed at the parallel process starting vertex as part of the principal process, some synchronisation of results can be performed. Let $S_{lc}$ be the first group of vertices, $S_{sb}$ be the set of boundary vertices that are selected as parallel process starting vertices:

For every arbitrary vertex $v_x \in S_{sb}$:

if $v_x \in S_{lc}$, update the pre-computed paths with the path length presented at $v_x$—for arbitrary vertex $v_y$ in $p_y$, this is done as $Dis(s, v_y)=Dis(s, v_x)+Dis(v_x, v_y)$ where Dis( ) presents the path length between two graph vertices;

if $v_x \notin S_{lc}$, and the k shortest paths from the parallel process starting vertex have not yet been calculated, discard any paths and path lengths from the parallel process starting vertex stored at the vertex.

Optionally, in data graphs with central vertices that do not change very frequently with respect to the frequency with which k shortest path analysis is performed, the overall performance can be improved if some caching is applied. For instance, based on historical data, estimation of betweenness centrality can be obtained from past computation. Lengths of shortest paths from the identified central vertices and other graph vertices whose shortest paths are already computed can then be cached to avoid duplicated computation in the future. This is done as follows:

Local data structure of vertices identified as Betweenness centres ($c_1$) can be extended with a map for highly frequently queried graph vertices (vertices that are commonly selected as destination vertices). Keys of the map are vertices of frequently queried graph vertices. The value part is also a map.

The value map of each selected vertex (e.g. $v_x$) is populated with the (k) shortest paths from $c_1$ to $v_x$, if the (k) shortest paths have been calculated as part of a method embodying the present invention.

When executing the computational procedure as part of the principal process, if the principal process reaches a betweenness centre, it will check whether a solution has already known by looking up the local map.

Cache match returns true, the k shortest paths from the source vertex to the betweenness centre are combined with the k shortest paths from the betweenness centre to vx to generate a preliminary result: the k shortest paths from s to vx via the betweenness centre.

Cache match returns false, principal process computation continues and a call back operation is flagged.

When the principal process is complete, the system should go back to update the cache of all the flagged betweenness centres.

The amount of storage space to dedicate to caching should be determined on a per implementation basis. Cache matching can be simply exact match (i.e. checking whether the target vertex is in the cache map/table) or graph based match (i.e. checking whether the cached vertices are on the path to the target vertex). The latter is computationally more expensive and may not always improve the overall performance. In many case, an exact match should be sufficient. Updating cache may be based on frequency as well as user defined criteria. Cached values with low significance or low use-rates may be deleted.

Although the aspects (software/methods/apparatuses) are discussed separately, it should be understood that features and consequences thereof discussed in relation to one aspect are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A computer-implemented method for finding the k shortest path lengths among paths between a source vertex and a destination vertex in a data graph composed of vertices interconnected by edges, a path being any series of vertices connected by edges along which path no single vertex is included more than once, the edges being attributed length values, and wherein k is an integer greater than or equal to two, the method including performing a principal process, the principal process comprising performing a computational procedure using a computer, the computational procedure comprising, for the or each vertex preceding a particular vertex, wherein a vertex is defined as preceding the particular vertex if the vertex is connected to the particular vertex by an edge and the vertex lies on one of the paths from a first vertex to the particular vertex:

receiving a notification that the computational procedure has been completed for the preceding vertex; and calculating new path lengths for the particular vertex by adding the length value attributed to the edge from the preceding vertex to the particular vertex to each of the recorded k shortest path lengths from the first vertex to the preceding vertex; the computational procedure further comprising:

maintaining a record of the k shortest path lengths calculated for the particular vertex; and after the new path lengths have been calculated for the or each of the preceding vertices, issuing a notification that the computational procedure has been completed for the particular vertex;

wherein the principal process comprises performing the computational procedure with the source vertex as the first vertex and each vertex on a path from the source vertex to the destination vertex as the particular vertex; wherein the data graph is divided into regions and stored distributed across more than one data storage unit, each data storage unit storing at least one of the regions and having a dedicated computational processing unit, the computational procedure being performed by the computational processing unit dedicated to the data storage unit on which the particular vertex is stored;

the method further comprising, concurrently with the principal process, performing a parallel process at each data storage unit, the or each parallel process comprising performing the computational procedure with a parallel process starting vertex as the first vertex and each vertex on a path from the parallel process starting vertex to the parallel process ending vertex as the particular vertex, wherein the parallel process starting vertex and the parallel process ending vertex are both on a path from the source vertex to the destination vertex, wherein the or each of the parallel process starting vertex and the corresponding parallel process ending vertex are from the same region, the parallel process starting vertex being a boundary vertex of the region, and the parallel process is performed for each vertex on any path composed of vertices also in the same region;

the method further comprising, for each region:

for each vertex at the boundary of the region, storing the vertex in association with the shortest path length from the vertex to the or each of the one or more identified central vertices of each of the other regions; and selecting the parallel process starting vertex for the region by identifying, from among the vertices at the boundary of the region, the vertex having the shortest path length to the or each of the one or more identified central vertices of the region containing the source vertex;

the method further comprising:

after the issuance of the notification that the computational procedure has been completed for a parallel process starting vertex, from among the one or more parallel process starting vertices, as part of the principal process, and after the issuance of the notification that the computational procedure has been completed for the corresponding parallel process ending vertex as part of the parallel process, modifying the k shortest path lengths from the parallel process starting vertex recorded at each of the vertices for which the computational procedure was performed as part of the parallel process by adding the k shortest path lengths from the source vertex recorded at the parallel process starting vertex.

2. A computer-implemented method according to claim 1, wherein
the method is repeated at least once with the same source vertex on each repetition and a different destination vertex on each repetition.

3. A computer-implemented method according to claim 1, wherein
the or each parallel process is repeated at least once with the same parallel process starting vertex on each repetition and a different parallel process ending vertex on each repetition.

4. A computer-implemented method according to claim 1, wherein the central vertices of a region are identified based on a betweenness centrality measure.

5. A computer-implemented method according to claim 1, wherein
maintaining a record of a shortest path length includes storing the path length in association with information identifying the one or more precedent vertices on the respective path.

6. A computer-implemented method according to claim 5, wherein the maintaining of the record includes:
storing, at the particular vertex, the precedent vertices on each of the k shortest paths in a Heap format with the respective k shortest path lengths as indexing values.

7. A computer-implemented method according to claim 5, wherein
storing the precedent vertices on each of the k shortest paths includes storing an identification of each of the precedent vertices on the shortest path, and for the remaining k−1 shortest paths, storing an identification of differences from the shortest path.

8. A computer-implemented method according to claim 1, wherein
in the computational procedure, calculating new path lengths for the particular vertex is performed on behalf of each preceding vertex in turn, by:
temporarily locking access to the record of the k shortest path lengths calculated for the particular vertex;
calculating new path lengths for the particular vertex by adding the length value attributed to the edge from the preceding vertex to the particular vertex to each of the recorded k shortest path lengths recorded at the preceding vertex;
updating the record of the k shortest path lengths calculated for the particular vertex so that it contains the k shortest path lengths from among the calculated new path lengths and the locked recorded k shortest path lengths; and
unlocking access to the record of the k shortest path lengths.

9. A computer-implemented method according to claim 1, wherein
issuing a notification that the computational procedure has been completed for a particular vertex includes transmitting to the or each vertices for which the particular vertex is a preceding vertex on a path from the source vertex to the destination vertex, the record of the k shortest path lengths for the particular vertex; and, in the computational procedure,
calculating new path lengths for the particular vertex comprises adding the length value attributed to the edge from the preceding vertex to the particular vertex to each of the k shortest path lengths included in the record received from the preceding vertex.

10. A computer-implemented method according to claim 1, wherein
the principal process includes determining the order in which the vertices become the particular vertex for which the computational procedure is performed by, selecting as the next particular vertex, from among the vertices for which the computational procedure has not yet been completed and for which the computational procedure has been completed at the or each of the respective preceding vertices, the vertex having the preceding vertex recorded as having the shortest path length to the source vertex.

11. A plurality of data storage units each having a processor, the processors being configured to find the k shortest path lengths among paths between a source vertex and a destination vertex in a data graph composed of vertices interconnected by edges, a path being any series of vertices connected by edges along which path no single vertex is included more than once, the edges being attributed length values, and wherein k is an integer greater than or equal to two, the processors being configured to perform a principal process, the principal process comprising performing a computational procedure using a computer, the computational procedure comprising:
for the or each vertex preceding a particular vertex, wherein a vertex is defined as preceding the particular vertex if the vertex is connected to the particular vertex by an edge and the vertex lies on one of the paths from a first vertex to the particular vertex:
receiving a notification that the computational procedure has been completed for the preceding vertex; and
calculating new path lengths for the particular vertex by adding the length value attributed to the edge from the preceding vertex to the particular vertex to each of the recorded k shortest path lengths from the first vertex to the preceding vertex; the computational procedure further comprising:
maintaining a record of the k shortest path lengths calculated for the particular vertex; and
after the new path lengths have been calculated for the or each of the preceding vertices, issuing a notification that the computational procedure has been completed for the particular vertex;
wherein the principal process comprises performing the computational procedure with the source vertex as the first vertex and each vertex on a path from the source vertex to the destination vertex as the particular vertex; wherein
the data graph is divided into regions and stored distributed across the plurality of data storage units, each data storage unit storing at least one of the regions, the computational procedure being performed by the processor of the data storage unit on which the particular vertex is stored;
each of the processors being configured, concurrently with the principal process, to perform a parallel process at the respective data storage unit, parallel process comprising performing the computational procedure with a parallel process starting vertex as the first vertex and each vertex on a path from the parallel process starting vertex to the parallel process ending vertex as the particular vertex, wherein the parallel process starting vertex and the parallel process ending vertex are both on a path from the source vertex to the destination vertex;

the plurality of data storage units being configured, for each of the regions:

for each vertex at the boundary of the region, to store the vertex in association with the shortest path length from the vertex to the or each of the one or more identified central vertices of each of the other regions; and to select the parallel process starting vertex for the region by identifying, from among the vertices at the boundary of the region, the vertex having the shortest path length to the or each of the one or more identified central vertices of the region containing the source vertex;

each of the processors being configured, after the issuance of the notification that the computational procedure has been completed for a parallel process starting vertex, from among the one or more parallel process starting vertices, as part of the principal process, and after the issuance of the notification that the computational procedure has been completed for the corresponding parallel process ending vertex as part of the parallel process, to modify the k shortest path lengths from the parallel process starting vertex recorded at each of the vertices for which the computational procedure was performed as part of the parallel process by the same processor by adding the k shortest path lengths from the source vertex recorded at the parallel process starting vertex.

* * * * *